United States Patent

Lawrence

[11] Patent Number: 5,588,402
[45] Date of Patent: Dec. 31, 1996

[54] CONTROL DEVICE FOR EXHAUST TIMING OF A TWO CYCLE ENGINE USING INTAKE SYSTEM PRESSURE

[75] Inventor: Thomas G. Lawrence, Clarkston, Mich.

[73] Assignee: Chrysler Corporation, Auburn Hills, Mich.

[21] Appl. No.: 553,911

[22] Filed: Nov. 6, 1995

[51] Int. Cl.⁶ .................................................. F02B 75/02
[52] U.S. Cl. ................................. 123/65 PE; 123/65 P
[58] Field of Search ........................... 123/65 PE, 65 V, 123/65 P

[56] References Cited

U.S. PATENT DOCUMENTS

| | | | |
|---|---|---|---|
| 4,364,346 | 12/1982 | Shiohara | 123/323 |
| 4,399,788 | 8/1983 | Bostelmann | 123/323 |
| 4,516,540 | 5/1985 | Nerstrom | 123/65 PE |
| 4,660,514 | 4/1987 | Nerstrom | 123/65 PE |
| 4,672,925 | 6/1987 | Miyata et al. | 123/65 PE |
| 4,920,932 | 5/1990 | Schlunke | 123/65 PE |
| 4,966,104 | 10/1990 | Hundleby | 123/65 BA |
| 4,998,524 | 3/1991 | Black et al. | 123/559.1 |
| 5,058,546 | 10/1991 | Lawrence | 123/198 C |
| 5,163,388 | 11/1992 | Jonsson | 123/65 BA |
| 5,183,013 | 2/1993 | Ito et al. | 123/65 PE |
| 5,197,434 | 3/1993 | Contreras Orellana | 123/65 BA |
| 5,307,792 | 5/1994 | Takahashi et al. | 123/65 BA |
| 5,341,775 | 8/1994 | Yamauchi | 123/65 PE |
| 5,423,304 | 6/1995 | Lawrence | 123/559.1 |
| 5,425,345 | 6/1995 | Lawrence et al. | 123/559.1 |

FOREIGN PATENT DOCUMENTS

| | | | |
|---|---|---|---|
| 62-35020 | 2/1987 | Japan | 123/65 PE |
| 1-262316 | 10/1989 | Japan | 123/65 PE |
| 06280574 | 10/1994 | Japan | 123/65 PE |
| 06280575 | 10/1994 | Japan | 123/65 PE |

*Primary Examiner*—David A. Okonsky
*Attorney, Agent, or Firm*—Kenneth H. MacLean

[57] ABSTRACT

A two stroke engine (10) has an exhaust port (16) extending from a side wall of a cylinder (12). A plate valve (26) is movable to an extended position where is the plate valve blocks the upper edge (54) of the exhaust port 16 to effectively retard the opening of the exhaust valve and retractable to a second position which provides the entire axial extent of the exhaust port (16) to be openable with respect to the cylinder. The position of the plate valve (26) is controlled by a diaphragm bladder (46) which is responsive to pressure in the intake system (19) that is in communication with the bladder (46) via an inlet passage (48).

7 Claims, 2 Drawing Sheets

5,588,402

1

CONTROL DEVICE FOR EXHAUST TIMING OF A TWO CYCLE ENGINE USING INTAKE SYSTEM PRESSURE

TECHNICAL FIELD

The field of this invention relates to an exhaust timing device for a two stroke cycle internal combustion engine.

BACKGROUND OF THE DISCLOSURE

Many two stroke cycle engines utilize variable timing for the exhaust port opening. A common way to achieve this variable timing is by incorporating a slide valve that is adjustably mounted adjacent the exhaust port to vary the effective height of the exhaust port.

The tuning of the exhaust port provides added torque and power. At high power capacity at high speed, it is desirable for the exhaust port to open earlier compared to low speed and high torque conditions. The retardation of the opening of the exhaust port at lower idle speeds, helps maximize power, increases fuel efficiency and provides for cleaner burn with lower emissions.

The known slide gates, rotary valve members, and other restriction or barrier devices which delay opening of the exhaust port have been controlled by expensive mechanical devices or by use of the exhaust pressure. The exhaust pressure works against a diaphragm which can move the slide gate valve against a spring bias. A major detriment to using the exhaust pressure is that the exhaust gas contains many solid particulates formed in the combustion cycle that tend to plug the small passages used to the deliver the exhaust gas to the diaphragm.

Recently, externally scavenged two stroke cycle engines have been developed that incorporate a high speed centrifugal air compressor mechanically driven by the crankshaft. The air is driven from the compressor into the intake system that includes an intake air chest formed in the engine block that is separate from the crankcase. The intake system leads to the intake port of each cylinder.

The use of an external air compressor provides several advantages over piston scavenged two stroke cycle engines. The air compressor eliminates the need for the cylinder piston to function as an air pump and thereby eliminates the need for roller bearings and seals between cylinders about the crankshaft. The use of an external air compressor also allows use of the crankcase to house an oil pan and provide for separate oil lubrication. The need for mixing engine oil with the gasoline supply is thereby eliminated for such two stroke cycle engines. Oil is no longer burned as part of the fuel mixture which provides for a cleaner burn. Examples of such external compressors for this type of engine are disclosed in U.S. Pat. Nos. 5,058,546; 4,998,524; 5,425,345; and 5,423,304.

What is needed is a control system that uses the pressure within the intake system downstream of the external pump to control the timing of the opening of the exhaust valve in a two stroke cycle engine.

SUMMARY OF THE DISCLOSURE

In accordance with one aspect of the invention, a two stroke cycle internal combustion engine includes a cylinder having an exhaust port and intake port extending therefrom. The exhaust port is positioned through a side wall of the cylinder such that axial reciprocal motion of a movable piston within the cylinder opens and closes the exhaust port that extends through the side wall. An intake system includes a variable speed pump for providing positive pressure to the intake system downstream of the pump that leads to the intake port of the engine. A barrier member is mounted in the engine adjacent the exhaust port and is adjustable between a first position, in which the exhaust port is exposed to the cylinder along its full axial extent and a second position, in which the barrier member obstructs the exhaust port from communication with the cylinder for a portion of the axial extent of the exhaust port to effectively delay opening of the exhaust port.

A positioning drive mechanism is operably connected to said barrier member between said first and second positions. The positioning drive mechanism is constructed to be controlled in part by said pressure in the intake system downstream of the pump and developed by the pump. The positioning drive mechanism includes a biasing device biasing the barrier member to its second position. The positioning drive mechanism is preferably in direct pressure communication with the pressure in the intake system downstream of said pump. A pressure sensitive device is constructed for overcoming the biasing device upon exertion of a predetermined pressure of the intake gas on the pressure sensitive device from said intake system downstream of the pump for moving the barrier member to its first position.

In one embodiment, the pressure sensitive device is a movable gas responsive member defining in part a pressure chamber which has a passage in fluid communication with the intake system downstream from the pump. Preferably, the pressure sensitive device is a flexible diaphragm member that defines in part the pressure chamber. The diaphragm member is mechanically connected to the barrier member such that the diaphragm is responsive to the pressure in the pressure chamber to move the barrier member to the first position against the bias of the biasing device.

In another embodiment, a control valve is interposed between the diaphragm and the intake system downstream of the pump for selectively and adjustably lowering the pressure of the intake system directed to the diaphragm member. The control valve is operably connected for moving between an open position and closed position by a signal from an electronic module which determines the optimum position of the control valve from several input signals one of which is determined from pressure from the intake valve system downstream of the pump.

In accordance with another aspect of the invention, a two stroke cycle internal combustion engine includes the positioning drive mechanism being controlled to position the barrier member in one of its first or second positions in part by pressure in the intake system downstream of the pump and developed by the pump via an electronic module which determines the optimum position of the positioning drive mechanism from several input signals one of which is determined from pressure from the intake system downstream of the pump which produces an appropriate output signal based on said input signals to control the position of the barrier member.

In accordance with another broader aspect of the invention, a two-stroke cycle internal combustion engine includes a cylinder having an exhaust port and intake port extending therefrom. At least one of the ports is positioned through a side wall of the cylinder such that axial reciprocal motion of a movable piston within the cylinder opens and closes the respective port that extends through the side wall. An intake system includes a variable speed pump for providing positive pressure to the intake system downstream of the pump that leads to the intake port of the engine. A movable barrier member is movable within the respective port and is adjustable between a first position, in which the respective port is exposed to the cylinder along its full axial extent and a second position, in which the barrier member obstructs the respective port from communication with the cylinder for a portion of the axial extent of the port to effectively control timing of the opening and closing of the port to the cylinder.

BRIEF DESCRIPTION OF THE DRAWINGS

Reference now is made to the accompanying drawings in which.

DETAILED DESCRIPTION OF THE PREFERRED EMBODIMENT

Figure 1:
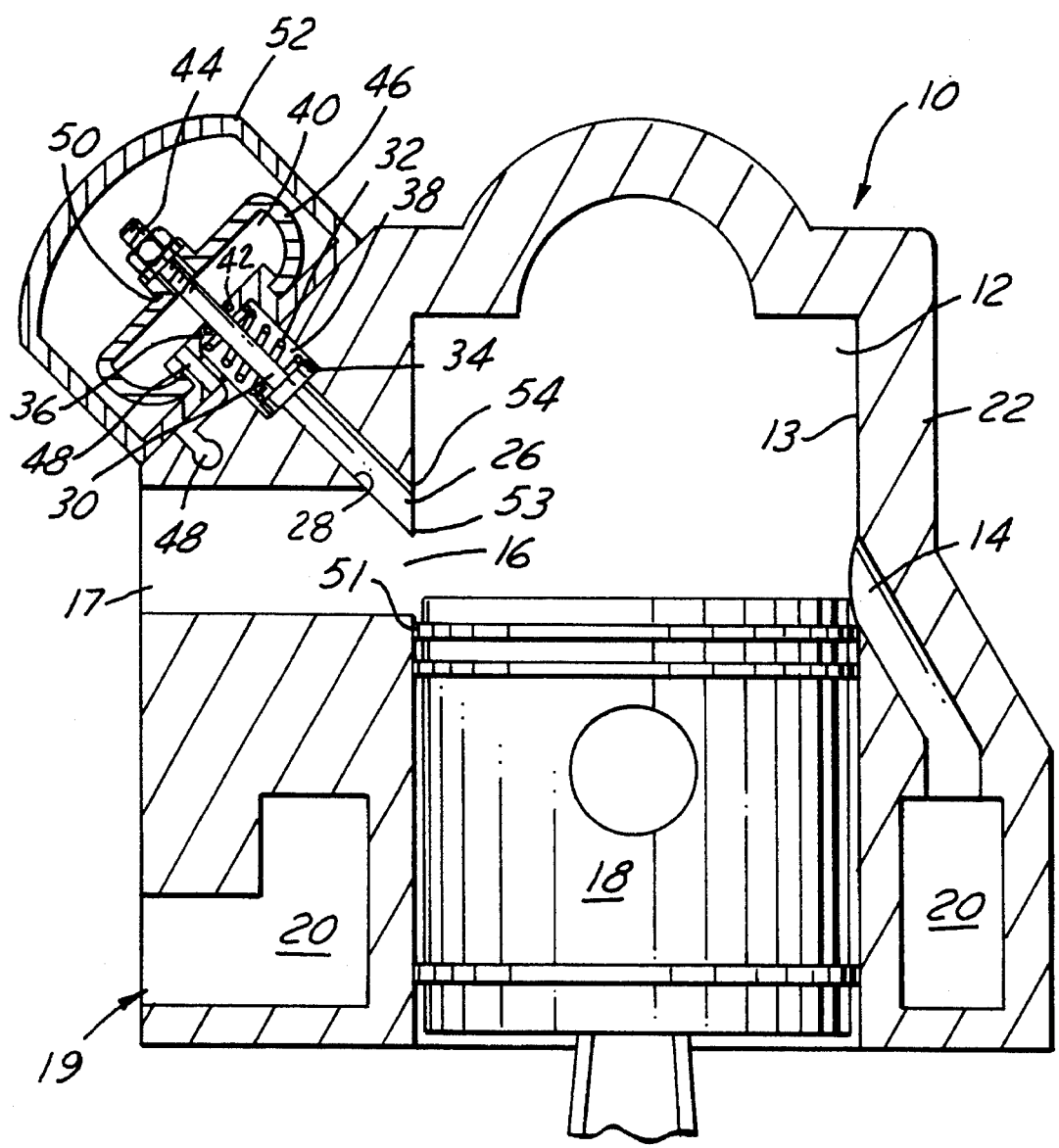
FIG. 1 is a fragmentary sectional view of a two stroke cycle engine according to one embodiment of the invention.
Figure 3:
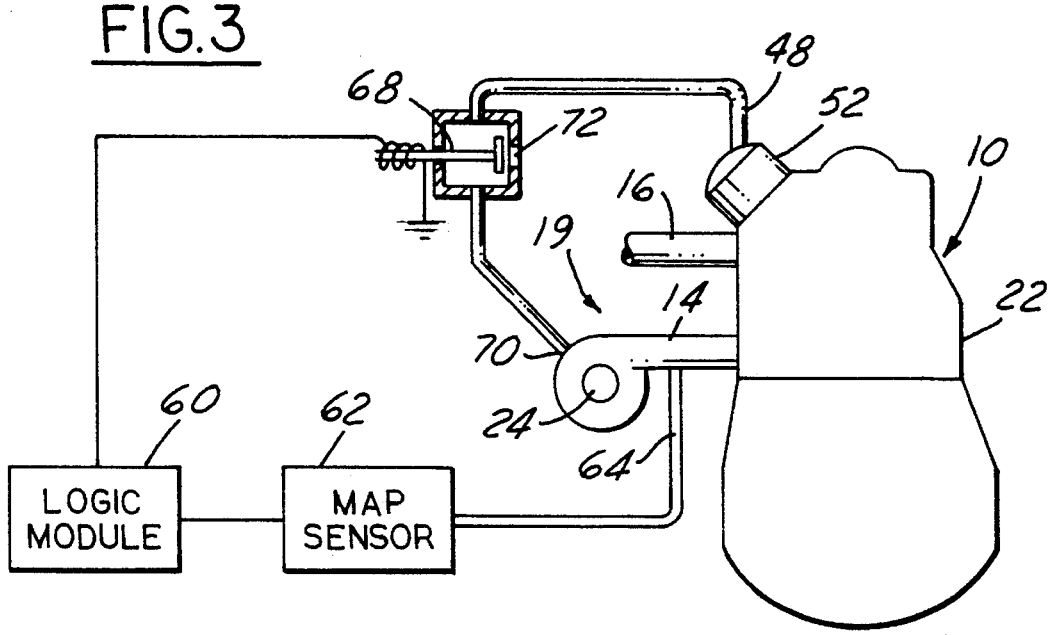
FIG. 3 is schematic view of a control system in accordance with a second embodiment of the invention.

Referring now to FIG. 1, a two stroke cycle engine 10 comprises a conventionally shaped cylinder 12 having a side wall 13. An inlet port 14 and an exhaust port 16 extend from the side wall 13. A piston 18 reciprocally moves within the cylinder and controls the opening and closing of the ports 14 and 16. The exhaust port 16 is connected to a conventional exhaust passage 17. The inlet port is connected to an intake system generally indicated as 19 which includes an internal air chest 20 within the engine block 22. The air chest is pressurized by a high speed centrifugal pump 24 (as shown in FIG. 3) that is mechanically driven by a conventional crankshaft, not shown for simplicity of the drawings.

A barrier member in the form of a slide plate 26 is slidably mounted in a guide passage 28 which is canted with respect to both the cylinder 12 and the exhaust passage 17. The plate is connected to a control stem 30 which is biased to the downward position by a compression coil spring 32 acting on a collar 34 affixed to the stem 30 and plate 26. The control stem 30 extends through a coil spring chamber 38 and through a pressure variable diaphragm chamber 40. The upper end of the coil spring is retained by a upper seat 36 formed in coil spring chamber 38.

A seal 42 slidably engages the control stem 30 at the upper seat 36 as it slides up and down through the seat 36. The top end 44 of the stem 30 is secured to a diaphragm bladder 46 that defines the chamber 40 with the upper seat 36. The chamber 40 is in communication with a inlet passage 48 which is in direct communication with the intake system 19, i.e. the air chest 20 or any other passage that is part of the intake system downstream from the pump 24. The communication of the inlet passage 48 to the intake system may be accomplished by cross drilling within the engine block itself. As shown in this embodiment, part of the inlet passage 48 passes through the seat 36. A protective cover 52 is mounted onto the engine to cover and protect the bladder 46 and stem 30 from ambient elements.

For lowest emission in the part throttle light load regime, the engine should run with as late an exhaust port timing as possible. The intake system pressure is low during this mode and thus the coil spring pushes the collar and hence the slide plate 26 to the extended operating condition shown in FIG. 1 which provides a barrier against early opening of the exhaust port 16. The exhaust port 16 does not commence opening until the piston ring 51 passes below lower edge 53 of the slide plate 26.

Figure 2:
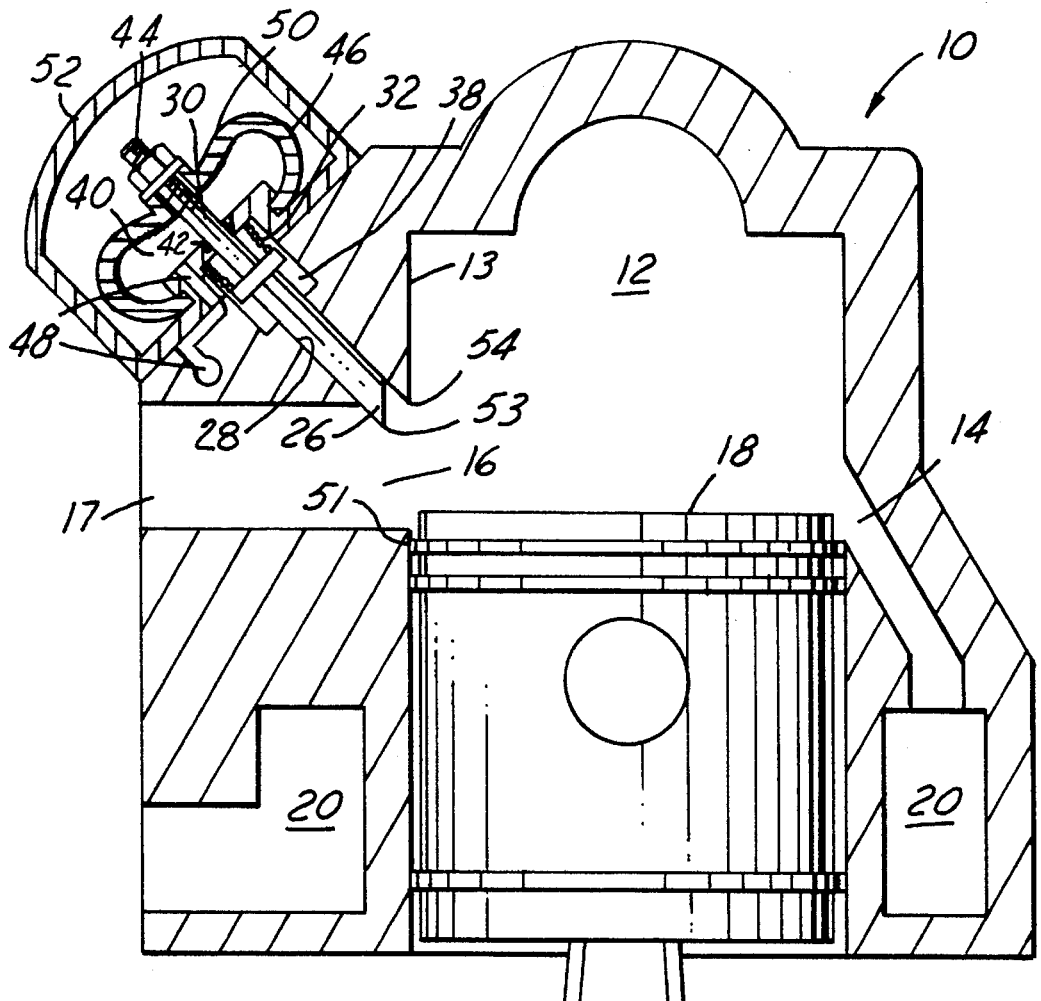
FIG. 2 is view similar to FIG. 1 illustrating the plate valve moved to the retracted position.

During higher speed operations, the intake system pressure becomes greater due to the greater pumping pressures of the pump 24 and less throttling of the intake system. The pressure is transmitted through the passage 48 and into the diaphragm chamber 40 which pushes the diaphragm top mounting wall 50 upward which pulls the control stem 30 and retracts the slide plate 26 from the position illustrated in FIG. 1 to the position illustrated in FIG. 2. The retracted position of the slide plate 26 opens the full axial extent of the exhaust port 16 and provides that the exhaust port 16 commences opening when the piston ring 51 passes down below top edge 54 of port 16. Thus the opening of the exhaust port occurs earlier in the down stroke relative to the position illustrated in FIG. 1.

The use of the intake system air eliminates the problems of combustion particulates that are present in exhaust gasses which can clog any small passages leading to diaphragm chambers. Furthermore, the intake system pressure provides for a more reliable and predictable pressure than the exhaust system.

A spring 32 with the appropriate strength can be properly selected for achieving the desired point upon which the slide plate 26 becomes retracted or extended based upon the predictable pressure/speed/throttle characteristics of the particular two stroke cycle engine to which it is mounted.

Another embodiment is shown in FIG. 3 which further incorporates an electronic control logic module 60. The module 60 is provided with a variable voltage signal from a MAP sensor 62 that depends in turn from a pressure signal 64 from the intake system at a point downstream from the high speed pump 24. The logic module may have inputs from other parameters such as engine speed, throttle position, coolant temperature, and ambient barometric pressure (not shown for simplicity of the drawing).

The logic module 60 produces an output signal over solenoid circuit 66 that opens and closes a control valve 68. The control valve 68 is interposed between inlet passage 48 to diaphragm chamber 40 and intake system 19 at a point 70 downstream from pump 24.

The control valve when open allows the pressure within line 48 to be regulated below the pressure within the intake system by allowing bleeding through valve port 72. Thus the logic module allows further control of the position of the slide valve 26 by which may override the intake system pressure which would otherwise automatically retract the slide plate 26. This further control is accomplished by opening the actuating the control valve 68 during certain parameter conditions to open the bleed port 72 and lower the pressure within inlet passage 48. The logic module may be programmed to incorporate many different parameters including the intake system pressure to achieve optimum exhaust timing for a wide range of conditions.

Other variations and modifications are possible without departing from the scope and spirit of the present invention as defined by the appended claims.

The embodiments in which an exclusive property or privilege is claimed are defined as follows:

1. In a two-stroke cycle internal combustion engine including a cylinder having an exhaust port and intake port leading thereto, said exhaust port being positioned through a side wall of said cylinder, a piston that is axially reciprocal in said cylinder and adapted to open and close said exhaust port through said side wall, an intake system including a variable speed pump for providing positive pressure to said intake system downstream of said pump that leads to said intake port, a barrier member being mounted in said engine adjacent to one of said exhaust or intake port and adjustable between a first position, in which said port is exposed to said cylinder along its full axial extent and a second position, in which said barrier member obstructs said port from communication with said cylinder for a portion of the axial extent of said port, a positioning drive mechanism operably connected to said barrier member between said first and second positions; the improvement characterized by:

the positioning drive mechanism being constructed to be controlled in part by said pressure in said intake system downstream of said pump and developed by said pump.

2. In a two-stroke cycle engine as defined in claim 1 further characterized by;

said positioning drive mechanism includes a biasing device biasing said barrier member to said second position;

said positioning drive mechanism being in direct pressure communication with said pressure in said intake system downstream of said pump;

a pressure sensitive device for overcoming said biasing device upon exertion of a predetermined pressure of said intake gas on said pressure sensitive device from said intake passage for moving said barrier member to said first position.

3. In a two-stroke cycle engine as defined in claim 2 further characterized by;

said pressure sensitive device being a movable gas responsive member defining in part a pressure chamber which has a passage in fluid communication with said intake system downstream from said pump.

4. In a two-stroke cycle engine as defined in claim 3 further characterized by;

said pressure sensitive device being a flexible diaphragm member defining in part said pressure chamber;

said diaphragm member being mechanically connected to said barrier member such that said diaphragm is responsive to said pressure in said pressure chamber to move said barrier member to said first position against the bias of said biasing device.

5. In a two-stroke cycle engine as defined in claim 4 further characterized by:

a control valve interposed between said diaphragm and said intake system downstream of said pump for selectively and adjustably lowering said pressure of said intake system directed to said diaphragm member;

said control valve being operably connected for moving between an open position and closed position by a signal from an electronic module which determines the optimum position of said control valve from several input signals one of which is determined from pressure from said intake valve system downstream of said pump.

6. In a two-stroke cycle engine as defined in claim 2 further characterized by:

a control valve interposed between said positioning drive mechanism and said intake system downstream of said pump for selectively and adjustably lowering said pressure of said intake system directed to said positioning drive member;

said control valve being operably connected for moving between an open position and closed position by a signal from an electronic module which determines the optimum position of said control valve from several input signals one of which is determined from pressure from said intake valve system downstream of said pump.

7. In a two-stroke cycle internal combustion engine including a cylinder having an exhaust port and intake port leading thereto, said exhaust port being positioned through a side wall of said cylinder, a piston that is axially reciprocal in said cylinder and adapted to open and close said exhaust port through said side wall, an intake system including a variable speed pump for providing positive pressure to said intake system downstream of said pump that leads to said intake port, a barrier member being mounted in said engine adjacent to one of said exhaust or intake port and adjustable between a first position, in which said port is exposed to said cylinder along its full axial extent and a second position, in which said barrier member obstructs said port from communication with said cylinder for a portion of the axial extent of said port and delays opening of said exhaust port, a positioning drive mechanism operably connected to said barrier member between said first and second positions; the improvement characterized by:

the positioning drive mechanism being controlled to position the barrier member in one of its first or second positions in part by said pressure in said intake system downstream of said pump and developed by said pump via an electronic module which determines the optimum position of said positioning drive mechanism from several input signals one of which is determined from pressure from said intake valve system downstream of said pump which produces an appropriate output signal based on said input signals to control the position of said positioning drive mechanism.

\* \* \* \* \*